US008872990B2

(12) United States Patent
Nomura et al.

(10) Patent No.: US 8,872,990 B2
(45) Date of Patent: Oct. 28, 2014

(54) DISPLAY DEVICE

(75) Inventors: Kimitaka Nomura, Osaka (JP); Tomoo Takatani, Osaka (JP); Hiroshi Fukushima, Osaka (JP); Ryoh Kikuchi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 169 days.

(21) Appl. No.: 13/809,532

(22) PCT Filed: Jul. 11, 2011

(86) PCT No.: PCT/JP2011/065786
§ 371 (c)(1),
(2), (4) Date: Jan. 10, 2013

(87) PCT Pub. No.: WO2012/008408
PCT Pub. Date: Jan. 19, 2012

(65) Prior Publication Data
US 2013/0107148 A1 May 2, 2013

(30) Foreign Application Priority Data

Jul. 12, 2010 (JP) ................................. 2010-157814

(51) Int. Cl.
*G02F 1/1335* (2006.01)
*G02F 1/1337* (2006.01)
*G02B 27/22* (2006.01)
*G02B 27/26* (2006.01)

(52) U.S. Cl.
CPC ............... *G02F 1/133784* (2013.01); *G02F 2001/133531* (2013.01); *G02B 27/2214* (2013.01); *G02B 27/26* (2013.01)
USPC .................................. 349/15; 349/96; 349/123

(58) Field of Classification Search
CPC ............... G02F 2001/133531; G02F 1/1335; G02F 1/133528; G02F 1/1337; G02F 1/133784; H04N 13/0409; H04N 13/00; H04N 13/0447; G02B 5/30; G02B 27/2228; G02B 27/286; G02B 27/22; G02B 27/225; G09G 2320/0626; G09G 2320/0646; G09G 2320/066; G09G 2320/0233; C09K 19/02
USPC .............. 349/96, 15, 123, 179; 348/E13.026, 348/E13.04, 42, 58; 359/465, 464, 466; 252/299.01
See application file for complete search history.

(56) References Cited

U.S. PATENT DOCUMENTS 5,315,377 A   5/1994   Isono et al.
(Continued)

FOREIGN PATENT DOCUMENTS

JP    5-122733    5/1993
(Continued)

OTHER PUBLICATIONS

International Search Report for PCT/JP2011/065786 mailed Oct. 11, 2011.

*Primary Examiner* — Thoi Duong
(74) *Attorney, Agent, or Firm* — Nixon & Vanderhye, P.C.

(57) ABSTRACT

An arrangement with a shared polarizer disposed between two panels capable of displaying a 3D image using parallax barrier techniques is provided, where the quality of a displayed 3D image is prevented from decreasing due to the left-right imbalance in contrast ratio. The arrangement includes: a main panel; a switch panel for displaying a slit image serving as a parallax barrier; a polarizer located closer to the viewed side of the main panel; a polarizer located between the main panel and the switch panel; and a polarizer located closer to the side of the switch panel opposite the side closer to the main panel. The direction of rubbing for one of the alignment films of the switch panel is at an angle relative to the absorption axis of one of the polarizers such that a contrast ratio within a view range of the left and right eyes is equal to or higher than a reference value, the contrast ratio being measured on a visual line corresponding to the transmission axis of one of the polarizers.

7 Claims, 13 Drawing Sheets

(56) References Cited

U.S. PATENT DOCUMENTS 5,969,850 A 10/1999 Harrold et al.
7,557,871 B2 * 7/2009 Matsumoto et al. ............ 349/15
2006/0082702 A1 4/2006 Jacobs et al.

FOREIGN PATENT DOCUMENTS

| JP | 10-62772 | 3/1998 |
| JP | 10-142572 | 5/1998 |
| JP | 2005-531804 | 10/2005 |

* cited by examiner

| SCREEN SIZE (INCHES) | OPTIMAL VIEW DISTANCE (mm) | ANGLE OF VIEW (DEGREES) |
|---|---|---|
| 3.5 | 300 | 13.1 |
| | 400 | 9.9 |
| 5.7 | 300 | 14.9 |
| | 400 | 11.3 |
| | 600 | 7.6 |
| 10.6 | 400 | 20.6 |
| | 600 | 14.0 |
| 17 | 600 | 19.3 |
| | 1000 | 11.9 |
| 21 | 1000 | 14.6 |
| | 2000 | 7.4 |
| 37 | 2000 | 13.5 |
| | 5000 | 5.5 |
| 52 | 3000 | 12.8 |
| | 5000 | 7.7 |

DISPLAY DEVICE

This application is the U.S. national phase of International Application No. PCT/JP2011/065786 filed 11 Jul. 2011 which designated the U.S. and claims priority to JP 2010-157814 filed 12 Jul. 2010, the entire contents of each of which are hereby incorporated by reference.

TECHNICAL FIELD

The present invention relates to a display device including a display panel capable of displaying three-dimensional (3D) images using parallax barrier techniques.

BACKGROUND ART

Display devices including a display panel capable of displaying 3D images using parallax barrier techniques are known. As disclosed in JP Hei5(1993)-122733 A, for example, such a display device includes two opposite liquid crystal panels, one of which displays images and the other displays black and white barrier stripe images. Thus, the other liquid crystal panel functions as a parallax barrier, allowing an image displayed on the one liquid crystal panel to be viewed in the form of a 3D stereo image. JP Hei5(1993)-122733 A discloses an arrangement where a polarizer is disposed on each face of each liquid crystal panel.

DISCLOSURE OF THE INVENTION

In a variation of the arrangement disclosed in JP Hei5(1993)-122733 A, a single polarizer may be disposed between the liquid crystal panels to work for the two liquid crystal panels. In such an arrangement, the angle of the absorption axis of this polarizer must be adjusted to the main liquid crystal panel which displays images (i.e. the main panel). In such implementations, the angle of the absorption axis of the polarizer is incongruous with the direction of rubbing for the other liquid crystal panel which displays black and white stripe images (i.e. the switch panel).

Even in a liquid crystal panel having contrast ratios distributed symmetrically to the left and right on a display panel if the direction of rubbing is congruous with the absorption axis of a polarizer, the distribution of the locations with a given contrast ratios may be in left-right imbalance and the overall contrast may decrease significantly if the direction of rubbing is incongruous with the absorption axis of the polarizer, as discussed above. Further, in the case of left-right imbalance in contrast ratio, the contrast ratios of an image viewed by one of the left and right eyes may be lower than a reference value such that stripe images serving as a parallax barrier may not be clearly displayed. This may significantly decrease the quality of a displayed 3D image in the case of parallax barrier techniques that use a parallax of the left and right eyes to allow the viewer to see a 3D image.

An object of the present invention is to provide an arrangement with a shared polarizer disposed between two panels capable of displaying a 3D image using parallax barrier techniques, where the left-right imbalance in contrast ratio may be reduced to prevent the quality of a displayed 3D image from decreasing.

A display device according to an embodiment of the present invention includes: a main panel configured to display an image; a switch panel located opposite the main panel for displaying a slit image serving as a parallax barrier to allow an image displayed on the main panel to be viewed stereoscopically; a first polarizer located closer to a viewed side of the main panel; a second polarizer located between the main panel and the switch panel; and a third polarizer located closer to a side of the switch panel opposite a side closer to the main panel, wherein the switch panel includes a pair of opposite substrates and a liquid crystal layer formed between the pair of substrates, each of the substrates has an alignment film on a side closer to the liquid crystal layer, the alignment films having been rubbed at different angles as viewed from a viewed side of the switch panel, a direction of rubbing for one of the alignment films located closer to the third polarizer is at an angle relative to an absorption axis of the third polarizer as viewed from the viewed side of the main panel such that a contrast ratio within a view range of left and right eyes is equal to or higher than a reference value, the contrast ratio being measured on a visual line for the switch panel corresponding to a transmission axis of the second polarizer.

The embodiment of the present invention will provide an arrangement with a shared polarizer disposed between two panels capable of displaying a 3D image using parallax barrier techniques, where the left-right imbalance in contrast ratio may be reduced to prevent the quality of a displayed 3D image from decreasing.

EMBODIMENTS FOR CARRYING OUT THE INVENTION

Figure 1:
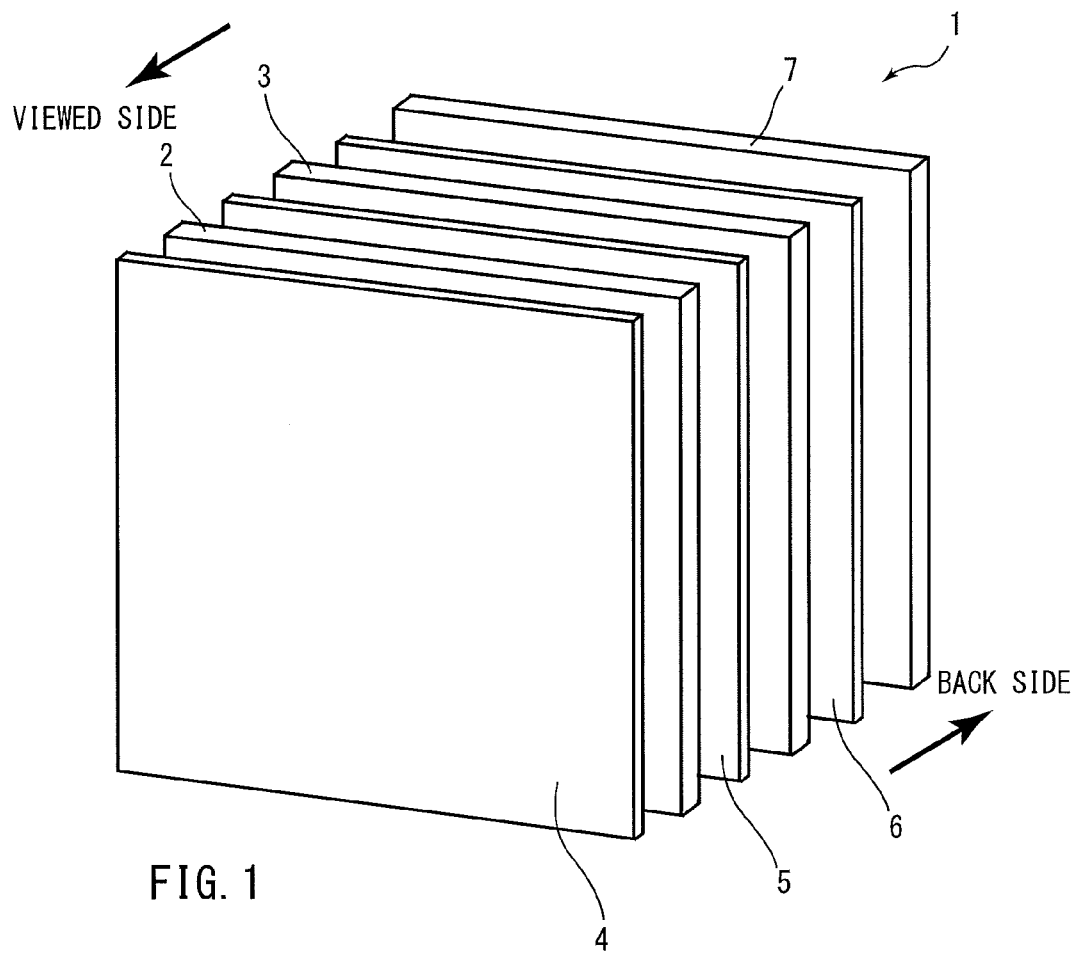
FIG. 1 is a schematic view of a display panel of a display device according to an embodiment of the present invention.

A display device according to an embodiment of the present invention includes: a main panel configured to display an image; a switch panel located opposite the main panel for displaying a slit image serving as a parallax barrier to allow an image displayed on the main panel to be viewed stereoscopically; a first polarizer located closer to a viewed side of the main panel; a second polarizer located between the main panel and the switch panel; and a third polarizer located closer to a side of the switch panel opposite a side closer to the main panel, wherein the switch panel includes a pair of opposite substrates and a liquid crystal layer formed between the pair of substrates, each of the substrates has an alignment film on a side closer to the liquid crystal layer, the alignment films having been rubbed at different angles as viewed from a viewed side of the switch panel, a direction of rubbing for one of the alignment films located closer to the third polarizer is at an angle relative to an absorption axis of the third polarizer as viewed from the viewed side of the main panel such that a contrast ratio within a view range of left and right eyes is equal to or higher than a reference value, the contrast ratio being measured on a visual line for the switch panel corresponding to a transmission axis of the second polarizer (first arrangement).

The visual line, in the visual angle characteristic diagram of the switch panel, is corresponding to the transmission axis of the second polarizer and has the same angle as that of the transmission axis. That is, the visual line, in the visual angle characteristic diagram of the switch panel, has the same angle as that of that transmission axis which allows light from the switch panel to pass through the second polarizer most efficiently. Thus, in a display device displaying 3D images, the visual angle characteristics of the switch panel for such a visual line significantly affects the quality of a displayed 3D image.

"View range" means the range of angles of view of the left and right eyes, which depends on the size of the display screen of the display device.

In the above arrangement, the contrast ratios in the view range for the visual line of the switch panel may be equal to or greater than a reference value that ensures a certain quality of a displayed 3D image. That is, in the above arrangement, the direction of rubbing for the one of the alignment films of the switch panel may be rotated off the absorption axis of the third polarizer which is located closer to the side of the switch panel opposite the side closer to the main panel to reduce the drop in contrast ratio for the visual line. Thus, when the left and right eyes view the display screen, the imbalance in contrast ratio caused by the difference between the absorption axis of the second polarizer and the direction of rubbing for the one of the alignment films of the switch panel may be reduced. Thus, for the visual line which affects the quality of displayed 3D images, the imbalance in contrast ratio as viewed by the left and right eyes may be reduced, thereby improving the quality of displayed 3D images.

In the first embodiment above, it is preferable that the direction of rubbing for the alignment film located closer to the third polarizer is at an angle relative to the absorption axis of the third polarizer as viewed from the viewed side of the switch panel such that contrast ratios resulting from a maximum angle of view for the left eye and a maximum angle of view for the right eye are equal in the view range, the contrast ratios being measured on the visual line (second arrangement).

Figure 17:
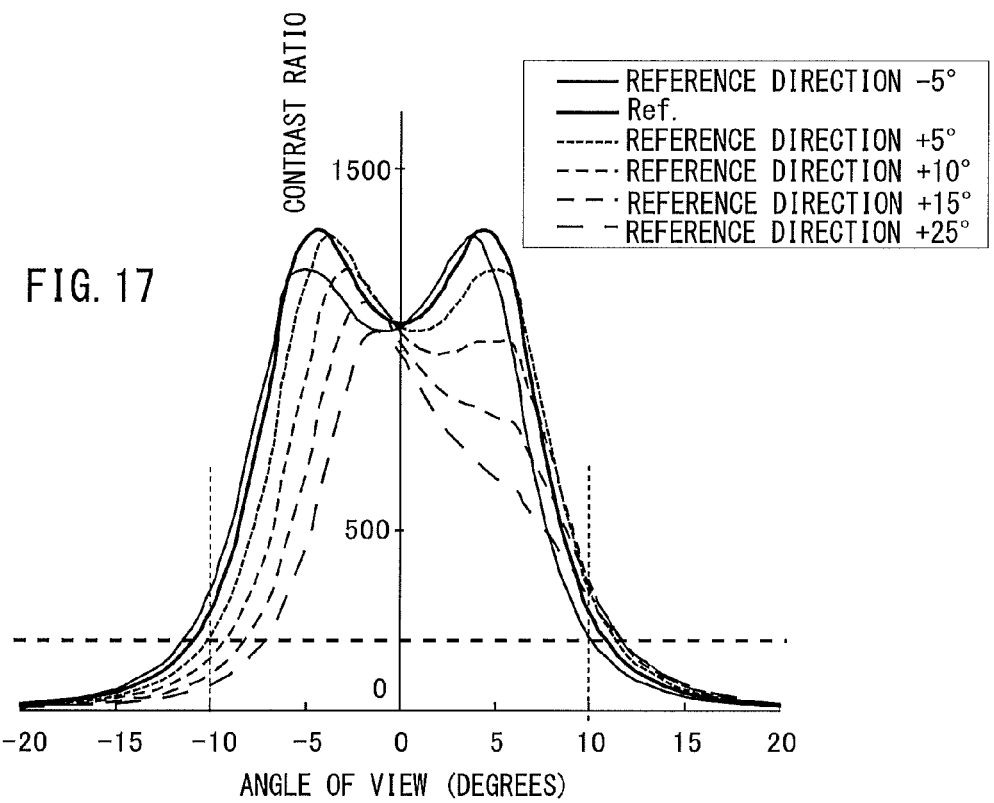
FIG. 17 is a graph showing changes in contrast ratio against the angle of view when the polarizer closer to the viewed side of the main panel has an absorption axis of −45 degrees.
Figure 18:
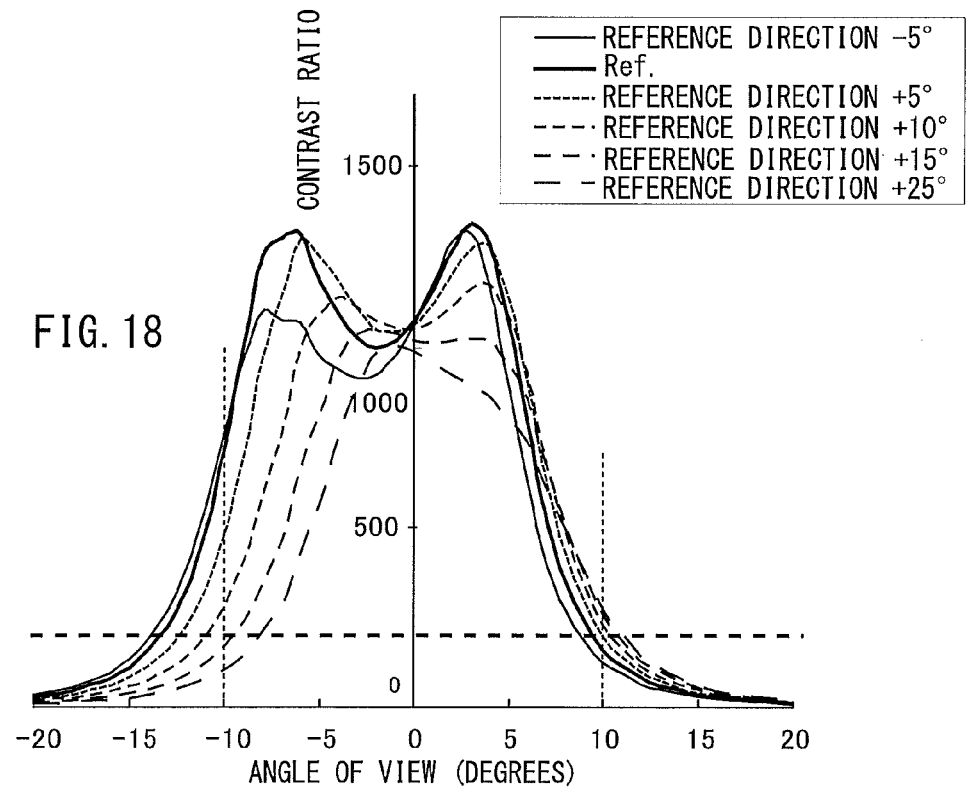
FIG. 18 is a graph showing changes in contrast ratio against the angle of view when the polarizer closer to the viewed side of the main panel has an absorption axis of −35 degrees.
Figure 19:
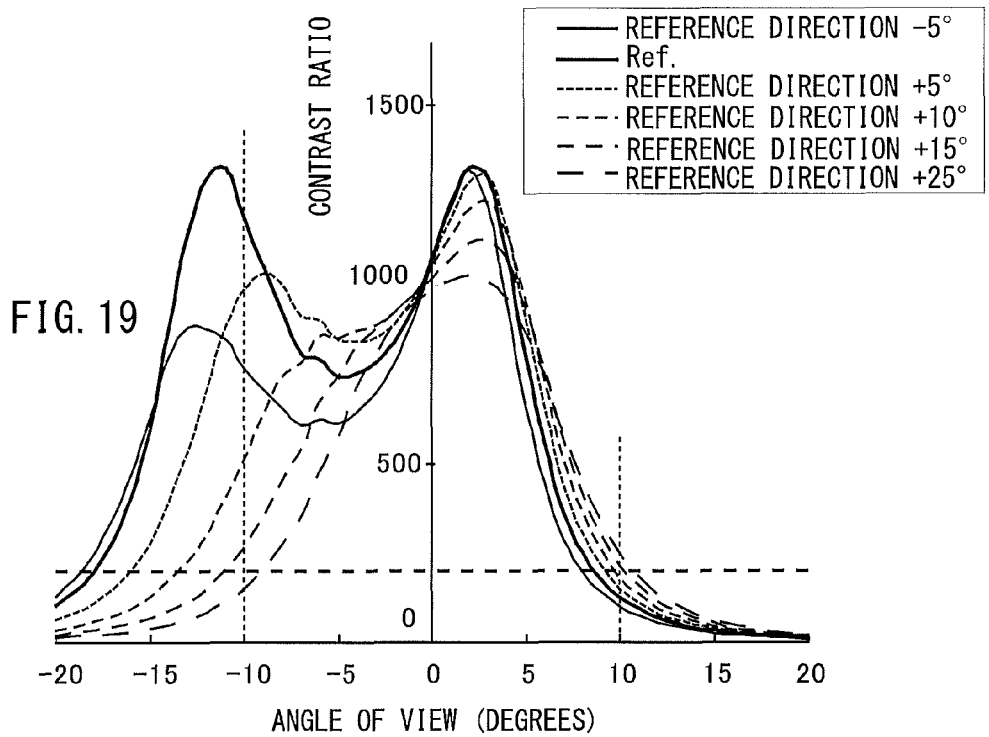
FIG. 19 is a graph showing changes in contrast ratio against the angle of view when the polarizer closer to the viewed side of the main panel has an absorption axis of −25 degrees.
Figure 20:
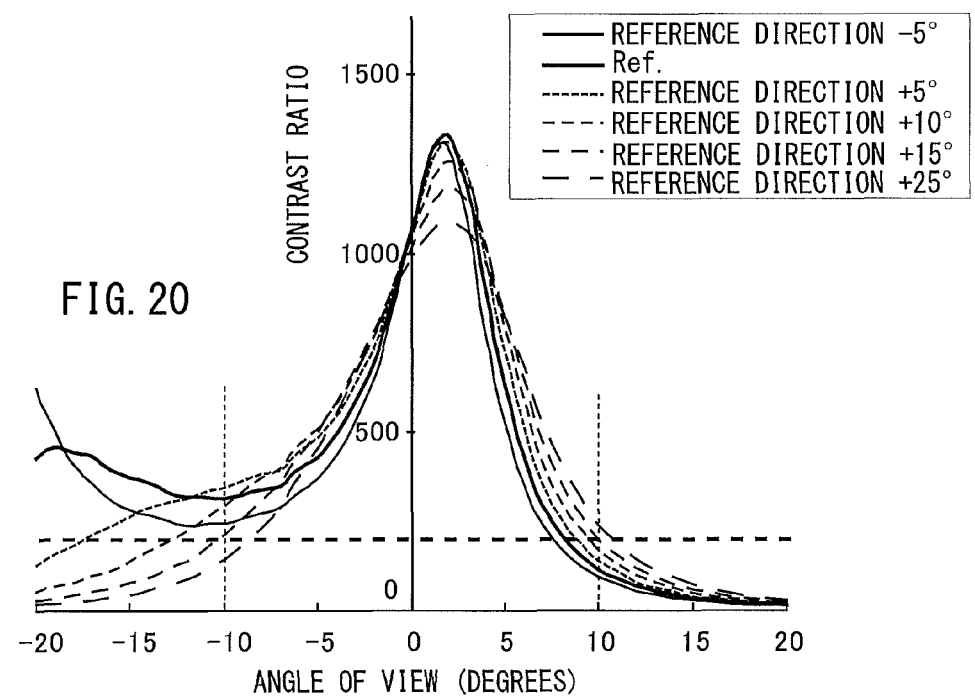
FIG. 20 is a graph showing changes in contrast ratio against the angle of view when the polarizer closer to the viewed side of the main panel has an absorption axis of −15 degrees.

Thus, the imbalance in contrast ratio within the view range of the left and right eyes for the visual line may be reduced. When the relationship between the angle of view and contrast ratio is depicted in a graph, it results in a shape of a mountain with larger contrast ratios for smaller angles of view (see FIG. 17, for example). Thus, as the values of contrast ratio for the maximum angle of view of the left eye and the maximum angle of view of the right eye in the view range of the left and right eyes are made closer to each other, the shape of a portion of the graph of the contrast ratio that is within the view range of the left and right eyes becomes close to symmetrical. This will improve the quality of a displayed 3D image when both eyes view the display screen of the display device.

In the first or second arrangement above, it is preferable that the switch panel is a TN liquid crystal panel (third arrangement). In a TN liquid crystal panel, the area of high contrast is shaped like an X as viewed from the viewer such that rotating a direction of rubbing off the absorption axis of a polarizer as discussed above will significantly change the contrast ratio. Thus, the first and second arrangements are particularly useful if the switch panel is a TN liquid crystal panel. Moreover, a TN liquid crystal panel has contrast ratios larger than liquid crystal panels of other types and can be fabricated more easily, and is thus suitable for display panels that form a parallax barrier to display a 3D image.

In the third arrangement above, it is preferable that the direction of rubbing for the alignment film located closer to the third polarizer is at an angle counterclockwise relative to the absorption axis of the third polarizer if the transmission axis of the second polarizer is at an angle of 0 to 45 degrees clockwise relative to a reference line extending horizontally as viewed from the viewed side of the main panel (fourth arrangement). On the other hand, it is preferable that the direction of rubbing for the alignment film located closer to the third polarizer is at an angle clockwise relative to the absorption axis of the third polarizer if the transmission axis of the second polarizer is at an angle of 0 to 45 degrees counterclockwise relative to a reference line extending horizontally as viewed from the viewed side of the main panel (fifth arrangement).

Thus, in a TN liquid crystal panel providing an X-shaped distribution of locations with greater contrast ratios as viewed from the viewer, the distribution of the locations with a given contrast ratio changes depending on the direction of rubbing. Thus, it is possible to position locations with greater contrast ratios near the visual line of the switch panel which is corresponding to the transmission axis of the second polarizer. Thus, the drop in contrast ratio may be reduced and the imbalance in contrast ratio as viewed by the left and right eyes may be reduced.

In the third arrangement above, it is preferable that, if the transmission axis of the second polarizer is at an angle of 45 to 90 degrees clockwise or counterclockwise relative to a reference line extending horizontally as viewed from the viewed side of the main panel, the direction of rubbing for the alignment film located closer to the third polarizer is at an angle in the same direction relative to the absorption axis of the third polarizer as a direction in which the transmission axis of the second polarizer is at an angle relative to the reference line (sixth arrangement).

Thus, even if the transmission axis of the second polarizer is at an angle of 45 to 90 degrees clockwise or counterclockwise relative to a reference line extending horizontally, the distribution of the locations with a given contrast ratio for the visual line of the switch panel may be made close to symmetrical without rotating significantly the direction of rubbing for the alignment film located closer to the third polarizer off the absorption axis of the third polarizer.

In any one of the third to sixth arrangements, it is preferable that the switch panel has a retardation of 1000 to 1300 nm (seventh arrangement). For a retardation dΔN in the range of 1000 to 1300 nm, contrast ratios are lower than for a range of retardations providing more yellowish white colors (dΔN=400 to 600 nm). The above arrangements may be employed for this range of retardations dΔN to correct the imbalance in contrast ratio to improve the quality of a displayed 3D image.

Now, a preferred embodiment of the display device of the present invention will be described with reference to the drawings. The sizes of the components in the drawings do not exactly represent the sizes of the actual components or the size ratios of the components.

FIG. 1 schematically illustrates a module 1 of a liquid crystal display device (display device) according to an embodiment of the present invention. The module 1 is fabricated by disposing several components upon one another in a thickness direction. Specifically, the module 1 includes a main panel 2 for displaying images, a switch panel 3 for displaying black and white images with slits (stripe images), and three polarizers 4, 5 and 6 sandwiching the main panel 2 and switch panel 3. The module 1 also includes a backlight 7.

As shown in FIG. 1, in the module 1 are disposed the polarizer 4 (first polarizer), main panel 2, polarizer 5 (second polarizer), switch panel 3, polarizer 6 (third polarizer) and backlight 7 upon one another in the stated order, beginning with the viewed side of the module (front side in FIG. 1). In the liquid crystal display device of the present embodiment, the polarizer 5 is used as both a polarizer located closer to the back side of the main panel 2 and a polarizer located closer to the viewed side of the switch panel 3.

The liquid crystal display device of the present embodiment is a so-called "parallax barrier" 3D image display device, where the switch panel 3 displays stripe images to form a parallax barrier and, as an image is displayed on the main panel 2, allows the image portions for the right eye to be viewed only by the right eye and the image portions for the left eye to be viewed only by the left eye. Thus, the main panel 2 displays, on one screen, left eye image portions and right image portions in synchronization with display of stripe images on the switch panel 3. When the liquid crystal display device of the present embodiment is to be used as a display device for 2D images, the display of the switch panel 3 is turned off such that the switch panel 3 is transparent.

The main panel 2 may be, for example, a vertical alignment (VA) liquid crystal panel. Although not shown, the main panel 2 includes an active matrix substrate with a large number of pixels arranged in a matrix and a counter-substrate opposite the active matrix substrate. Further, the main panel 2 includes a liquid crystal layer between the active matrix substrate and counter-substrate, the liquid crystal layer capable of switching between a state for causing birefringence for light and a state for passing light.

The active matrix substrate includes, on a transparent substrate such as a glass substrate, a plurality of thin film transistors (TFTs; not shown), pixel electrodes, a plurality of lines (source lines, gate lines and the like) and other components. The TFTs are similar to conventional ones and thus a detailed description will not be given.

The pixel electrodes are transparent electrodes and may be made of a translucent conductive material, such as indium tin oxide (ITO), for example. The pixel electrodes are separated from each other, each provided for a pixel. A pixel electrode defines a pixel, which forms a unit in image display.

Although not shown, the source electrode, gate electrode and drain electrode of a TFT are connected with a source line, gate line and pixel electrode, respectively. A signal is provided to a TFT via a gate line and a source line to drive the TFT in the same manner as in a conventional liquid crystal display device, and thus a detailed description of this process will not be given.

The counter substrate includes, on a transparent substrate such as a glass substrate, a common electrode made of a transparent conductive film, such as ITO, and other components. The counter-substrate has R, G and B color filters provided thereon.

In a main panel 2 having such a configuration, the electric field applied to the liquid crystal layer, i.e. the voltage applied between the common electrode and the pixel electrodes is controlled to switch the liquid crystal layer between the state for passing light and the state for causing birefringence for light on a pixel basis. That is, the application of an electric field to the liquid crystal layer is controlled by TFTs such that light passes through those areas of the liquid crystal layer that can pass light, thereby allowing areas colored by the color filters to appear as part of a color image.

In the present embodiment, the counter-substrate includes color filters; however, the present embodiment is not limited to such a configuration and may provide a counter-substrate without color filters.

The switch panel 3 may be, for example, a twisted-nematic (TN) liquid crystal panel. Using a TN liquid crystal panel as the switch panel 3 will allow the slits displayed on the switch panel 3 to be displayed with higher contrasts than liquid crystal panels using other techniques. Thus, the liquid crystal display device of the present embodiment is capable of displaying 3D images with high quality.

Figure 2:
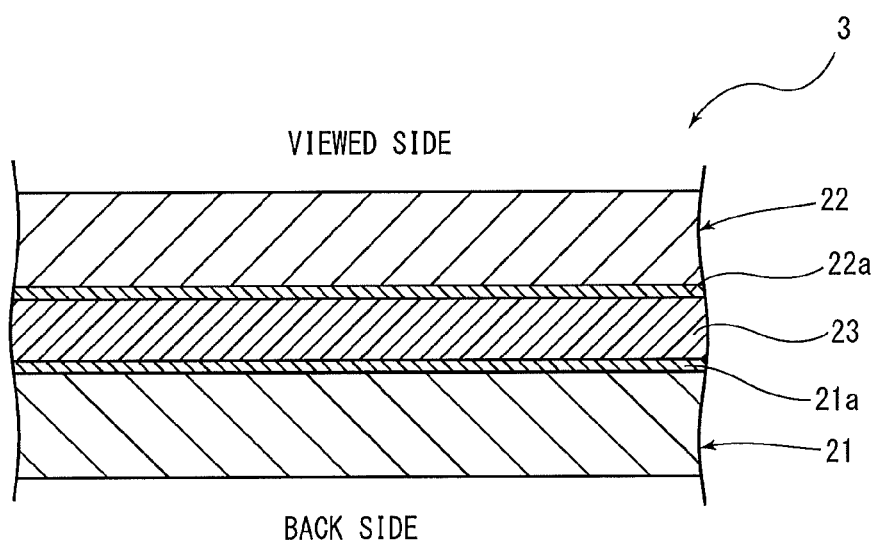
FIG. 2 is a schematic cross-sectional view of the switch panel.

The switch panel 3 includes a substrate 21 with an electrode shaped with slits, and a counter-substrate 22 opposite the substrate 21 (see FIG. 2). Further, the switch panel 3 includes a liquid crystal layer 23 between the substrate 21 and counter-substrate 22, the liquid crystal layer capable of switching between a state for rotating light and a state for passing light.

Figure 3:
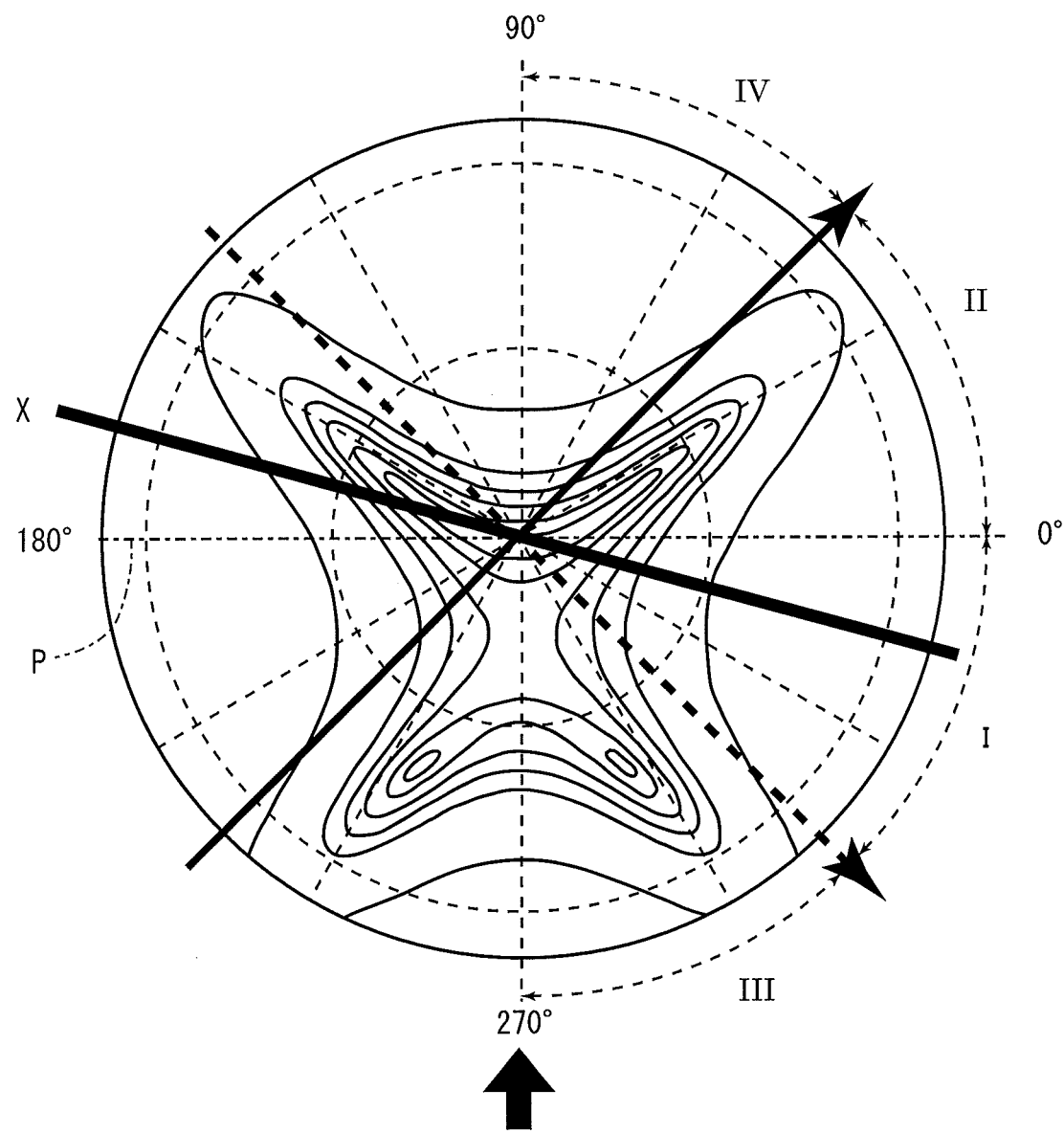
FIG. 3 illustrates contrast characteristics, i.e. a type of visual angle characteristics of the switch panel.

Alignment films 21a and 22a are provided on the sides of the liquid crystal layer 23 closer to the substrate 21 and counter-substrate 22, respectively, of the switch panel 3. The alignment films 21a and 22a are "rubbed", where their surfaces are rubbed in one direction by a cloth, for example. Rubbing the alignment films 21a and 22a allows liquid crystal molecules in the liquid crystal layer 23 to be oriented in a certain direction. In the present embodiment, the alignment films 21a and 22a on the substrate 21 and counter-substrate 22 are rubbed such that the direction of rubbing for the alignment film 21a on the substrate 21 is at an angle of around 90 degrees, as viewed from the viewer, relative to the direction of rubbing for the alignment film 22a on the counter-substrate 22. For example, in the present embodiment, as shown in FIG. 3, the direction of rubbing for the alignment film 22a on the viewed side of the liquid crystal layer 23 (indicated by the arrow with a solid line in the drawing) has an angle of around 90 degrees counter-clockwise, as viewed from the viewer, relative to the direction of rubbing for the alignment film 21a on the back side of the liquid crystal layer 23 (indicated by the arrow with a broken line in the drawing).

Rubbing the alignment films 21a and 22a in directions with an angle of around 90 degrees allows liquid crystal molecules in the liquid crystal layer 23 to be twisted with a difference in angle of 90 degrees at the substrate 21 side and the counter-substrate 22 side. Thus, the switch panel 3 functions as a TN liquid crystal panel.

The substrate 21 of the switch panel 3 may have any configuration as long as it is capable of displaying slits on the switch panel 3, such as an active matrix substrate with a large number of pixels arranged in a matrix, for example.

The switch panel 3 of the present embodiment is configured such that the liquid crystal in the liquid crystal layer 23 has a retardation dΔN (cell thickness×birefringence) of 1000 to 1300 nm. In a TN liquid crystal panel, two ranges of dΔN, i.e. dΔN=400 to 600 nm and dΔN=1000 to 1300 nm, have a relatively large transmittance. For dΔN=400 to 600 nm, contrast ratios are relatively large and the displayed white color is close to a more yellowish white color than for dΔN=1000 to 1300 nm. For dΔN=1000 to 1300 nm, contrast ratios are smaller than for dΔN=500 nm. Since white colors that are not yellowish are generally preferred, the present embodiment uses liquid crystal with dΔN=1000 to 1300 nm in the switch panel 3. However, such implementations result in contrast ratios that are relatively small, affecting the quality of displayed images due to a drop in contrast ratio, as will be discussed below.

The polarizers 4, 5 and 6 are configured to pass only the components of light in a certain direction. The polarizers 4 and 5 have absorption axes adapted to the characteristics of the main panel 2 to polarize light passing through the main panel 2. The polarizers 4 and 5 are disposed such that their absorption axes are perpendicular to each other. The polarizer 6 has an absorption axis adapted to the characteristics of the switch panel 3 to polarize light passing through the switch panel 3. The polarizers 4, 5 and 6 have transmission axes perpendicular to their absorption axes.

Typically, in a VA liquid crystal panel, the polarizers are configured such that the absorption axis of the polarizer closer to the back side of the panel is at an angle of 55 to 70 degrees (the absorption axis of the polarizer closer to the viewed side of the panel is at an angle of −35 to −20 degrees). In a TN liquid crystal panel, the polarizers are configured such that the absorption axis of the polarizer closer to the back side of the panel is at an angle of −45 degrees (the absorption axis of the polarizer closer to the viewed side of the panel is at an angle of 45 degrees). A counterclockwise angle of an absorption axis relative to a horizontal direction when the panel is viewed from the viewer will be referred to as positive, while a clockwise angle will be referred to as negative.

If a polarizer 5 used for both the VA main panel 2 and the TN switch panel 3 is provided between them, as in the present embodiment, the absorption axis of the polarizer 5 is made to have an angle adapted to the characteristics of the main panel 2. Thus, in the present embodiment, the angle of the absorption axis of the polarizer 5 is the angle of the absorption axis of the polarizer of the VA main panel 2. As such, the angle of the absorption axis of the polarizer 5 is different from the angle of the absorption axis of the polarizer of the TN switch panel 3. Thus, as detailed below, the visual angle characteristics provided when the viewer only sees the switch panel 3 is different from the visual angle characteristics provided when the viewer sees the switch panel 3 combined with a main panel 2.

Figure 4:
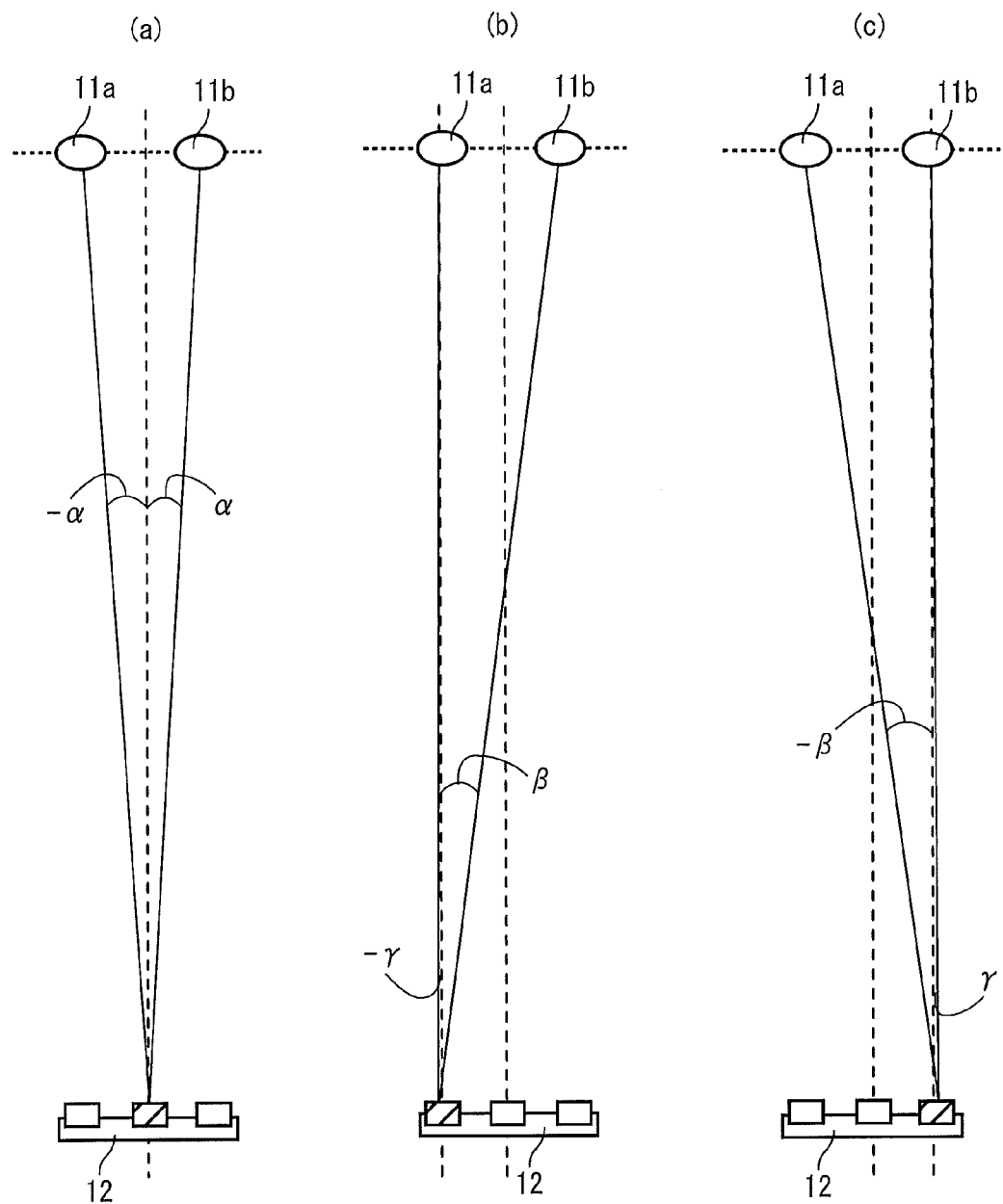
FIG. 4 schematically illustrates angles of view of both eyes.

When the viewer looks at the liquid crystal display device with both eyes, the view lines of the eyes relative to the panel have different angles (hereinafter referred to as "angle(s) of view") since the eyes of a human being are horizontally spaced apart. Specifically, as shown in FIG. 4, when the viewer looks at the central portion of the liquid crystal panel 12 with the left eye 11a and right eye 11b (FIG. 4(a)), the angles of view α formed by the view lines of the left eye 11a and right eye 11b with the normal to the display surface of the liquid crystal panel 12 are substantially equal. On the other hand, when the viewer looks at the left end and right edge portions of the liquid crystal panel 12 (FIGS. 4(b) and (c)), the angles of view β and γ formed by the view lines of the left eye 11a and right eye 11b with the normal to the display surface of the liquid crystal panel 12 are significantly different.

The visual angle characteristic diagram shown in FIG. 3, for example, illustrates changes in contrast ratio caused by the differences in the angle of the view line of each eye. The visual angle characteristic diagram depicts the contrast characteristics provided when the viewer sees the display screen with both eyes. In the visual angle characteristic diagram, the position in a radial direction represents the angle of view, while the position in a circumferential direction represents the azimuth as measured on the display surface of the liquid crystal panel. In the present embodiment, the viewer is positioned in the direction of the normal line extending from the center of the liquid crystal panel. As such, the perimeter of the visual angle characteristic diagram represents the visual angle characteristics provided when the viewer looks at the perimeter of the display surface of the liquid crystal panel. More particularly, the angle between the view line of the right eye and the normal to the display surface (i.e. the angle of view of the right eye) is represented by the position in a radial direction in the visual angle characteristic diagram in the right half of the visual angle characteristic diagram, the halves being divided at the center of the diagram, and the angle will be referred to as a positive one. On the other hand, the angle between the view line of the left eye and the normal to the display surface (i.e. the angle of view of the left eye) is represented by the position in a radial direction in the visual angle characteristic diagram in the left half of the visual angle characteristic diagram, the halves being divided at the center of the diagram, and the angle will be referred to as a negative one.

FIG. 3 represents results of simulations of the visual angle characteristics of the switch panel 3, which is a TN liquid crystal panel. In the visual angle characteristic diagram of FIG. 3, the line extending horizontally in the right half of the diagram defines 0 degrees, where the angle of direction increases as the position advances counterclockwise. In the following description, for convenience, a horizontal direction in the visual angle characteristic diagram will be referred to as "three-to-nine-o'clock direction", and a vertical direction will be referred to as "six-to-twelve-o'clock direction". Further, in the following description, the line extending in a three-to-nine-o'clock direction in the visual angle characteristic diagram defines the reference line (in FIG. 3, the reference line is labeled with the character P. Labeling is not made in other diagrams). The black-filled arrow in FIG. 3 indicates the direction where color reversal is most unlikely to occur when the viewer sees the panel (the six o'clock direction in the example of FIG. 3, which will be hereinafter referred to as "reference direction"). The reference direction depends on the arrangement of liquid crystal molecules. In a TN liquid crystal panel as in the present embodiment, the reference direction depends on the directions of rubbing for the alignment films sandwiching the liquid crystal layer.

As can be understood from FIG. 3, the switch panel 3, which is a TN liquid crystal panel, has visual angle characteristics with a generally X-shaped distribution of locations with relatively large contrast ratios in the visual angle characteristic diagram. Thus, the visual angle characteristics of the switch panel 3 are such that the contrast ratios for the same angles of view of the right and left eyes are substantially the same as measured in a three-to-nine-o'clock direction (the distribution of locations with a given contrast ratio is generally symmetrical as measured in a radial direction). On the other hand, as detailed below, the visual angle characteristics in positions offset from the horizontally extending reference line have an imbalanced distribution of locations with a given contrast ratio for the angles of view of the right eye and the left eye (i.e. the distribution of locations with a given contrast ratio as measured in a radial direction to the left and right is in imbalance).

In the results of simulations shown in FIG. 3, the visual angle characteristics of the switch panel 3 are determined while taking the switch panel 3 and the polarizers on both sides of the switch panel 3 into consideration. These polarizers are such that the absorption axis of the polarizer closer to the back side of the switch panel 3 has an angle of −45 degrees and the absorption axis of the polarizer closer to the viewed side of the switch panel 3 has an angle of 45 degrees.

If 3D images are to be displayed using parallax barrier techniques as in the present embodiment, contrast ratios on the switch panel 3 are important and the symmetric properties of contrast ratios significantly affect the quality of displayed 3D images. Particularly, since the eyes of a human being are horizontally disposed, as discussed above, the symmetric properties of contrast ratios on the switch panel 3, as measured in a horizontal direction when the viewer sees a 3D image displayed on the liquid crystal display device, are important.

Since in the present embodiment, the main panel 2 and polarizers 4 and 5 are located closer to the viewed side of the switch panel 3, as shown in FIG. 1, only those components of light from the switch panel 3 which are associated with the transmission axis of the polarizers 4 and 5 pass through the polarizers 4 and 5. Thus, the quality of a displayed 3D image is not affected by contrast ratios of horizontal components on the switch panel 3, but by those components of contrast ratios on the switch panel 3 which are associated with the transmission axis of the polarizers 4 and 5. Particularly, the polarizer 5 closer to the viewed side of the switch panel 3 significantly affects the display of stripe images, and thus those components of visual angle characteristics on the switch panel 3 which are associated with the transmission axis of the polarizer 5 significantly affect the quality of a displayed 3D image. The heavy line X in FIG. 3 indicates the visual line corresponding to the transmission axis of the polarizer 5 in the present embodiment.

Figure 5:
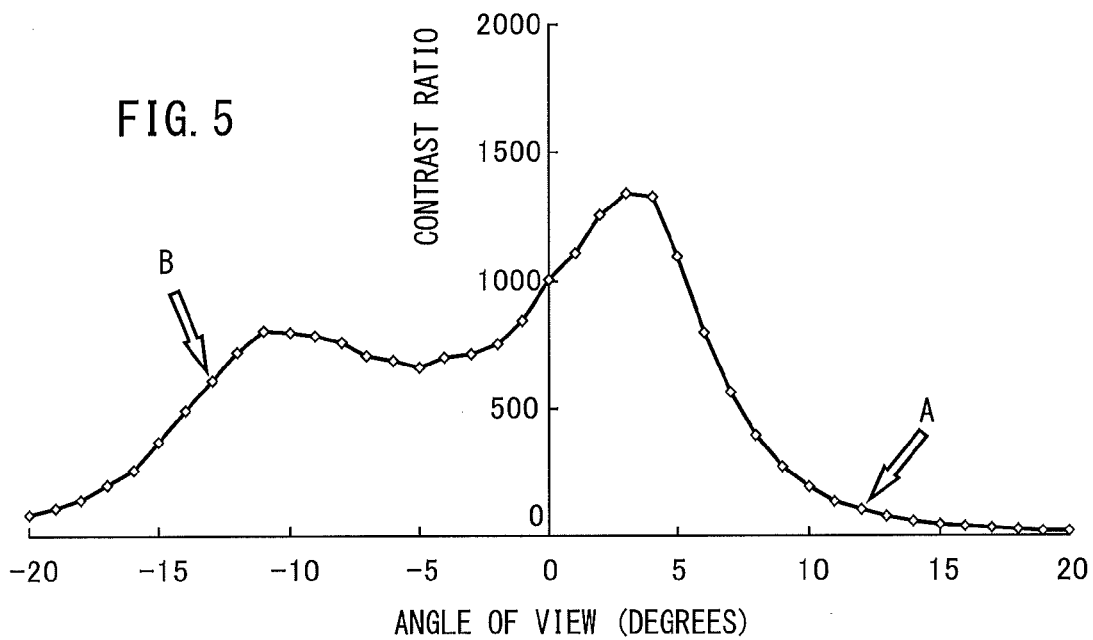
FIG. 5 is a graph showing exemplary measurements of contrast ratio corresponding to the visual line X in FIG. 3.

FIG. 5 shows measurements of contrast ratio corresponding to the visual line X of FIG. 3. In FIG. 5, A indicates the contrast ratio provided when the viewer looks at the left edge of the panel with the right eye, while B indicates the contrast ratio provided when the viewer looks at the right edge of the panel with the left eye. As can be understood from FIG. 3, along the visual line X, the contrast ratios provided when the viewer looks at the left edge of the panel with the right eye are generally lower than the contrast ratios provided when the viewer looks at the right edge of the panel with the left eye, and the similar tendencies can be found in FIG. 5. Further, the results shown in FIG. 5 have characteristics similar to those in the graphs showing the results of simulations shown in FIGS. 9 to 11, discussed below, proving that the present simulations provide results close to the reality. In view of this, the description below will be based on the results of calculations of contrast ratios from simulations.

The visual angle characteristics of the switch panel 3 shown in FIG. 3 are divided into four regions based on the angle of the absorption axis of the polarizer 6 (45 or −45 degrees). That is, the visual angle characteristics shown in FIG. 3 are divided into the region from 0 to −45 degrees (region I in the drawing), the region from 0 to 45 degrees (region II in the drawing), the region from −45 to −90 degrees (region III in the drawing) and the region from 45 to 90 degrees (region IV in the drawings). The angles defining the regions in FIG. 3 are relative to the reference line, where the reference direction described above is the six o'clock direction.

Figure 6:
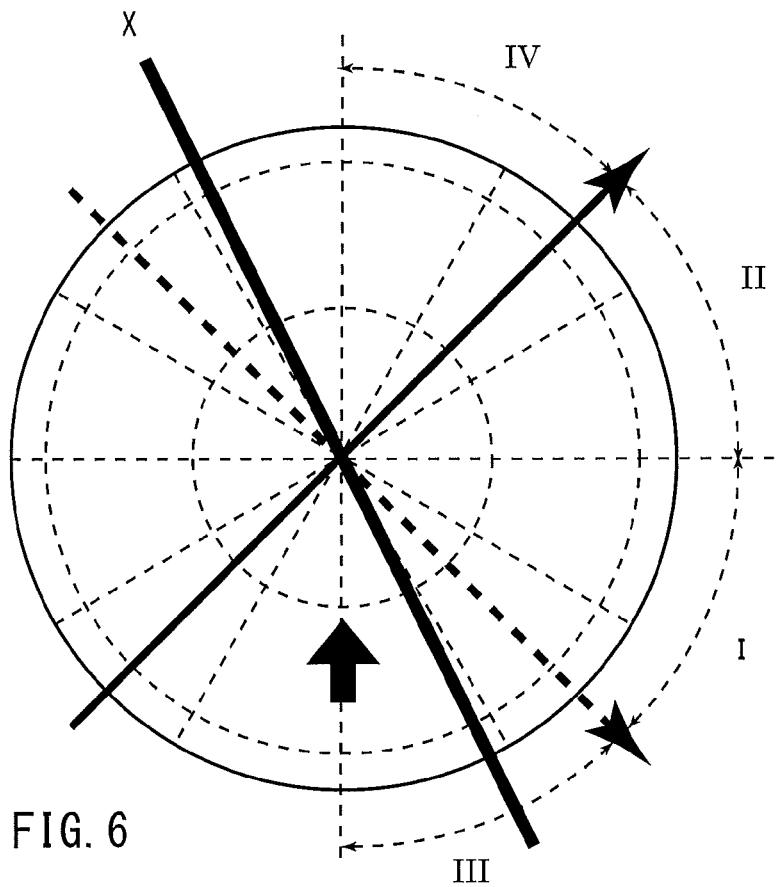
FIG. 6 illustrates the visual line X positioned at the region III in the visual angle characteristic diagram of the switch panel.

For example, if the visual line X is positioned at the region III, as shown in FIG. 6, the directions of rubbing for the alignment films 21a and 22a may be rotated 90 degrees clockwise off the conventional directions of rubbing (−45 and 45 degrees) to position the visual line X at the region II of FIG. 3.

The manner in which, if the visual line X is positioned at the region III, for example, the directions of rubbing for the alignment films 21a and 22a may be rotated 90 degrees clockwise off the conventional directions of rubbing (−45 and 45 degrees) to position the visual line X at the region II will be described below. Each of the short black-filled arrows in the FIGS. 6 to 8 indicates the reference direction.

Figure 7:
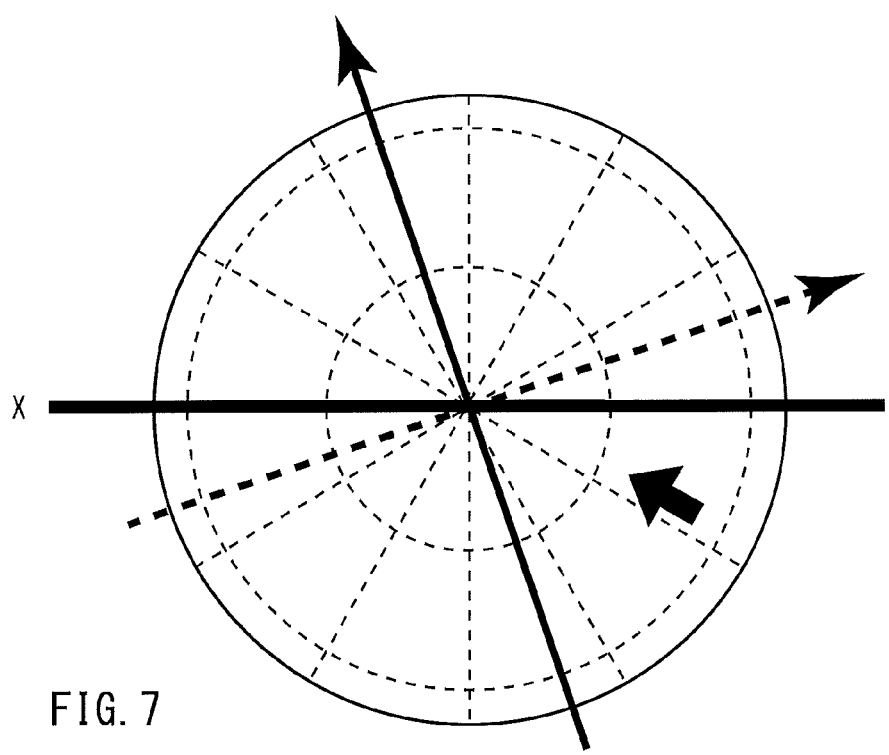
FIG. 7 illustrates the visual line X being congruous with a three-to-nine-o'clock direction.
Figure 8:
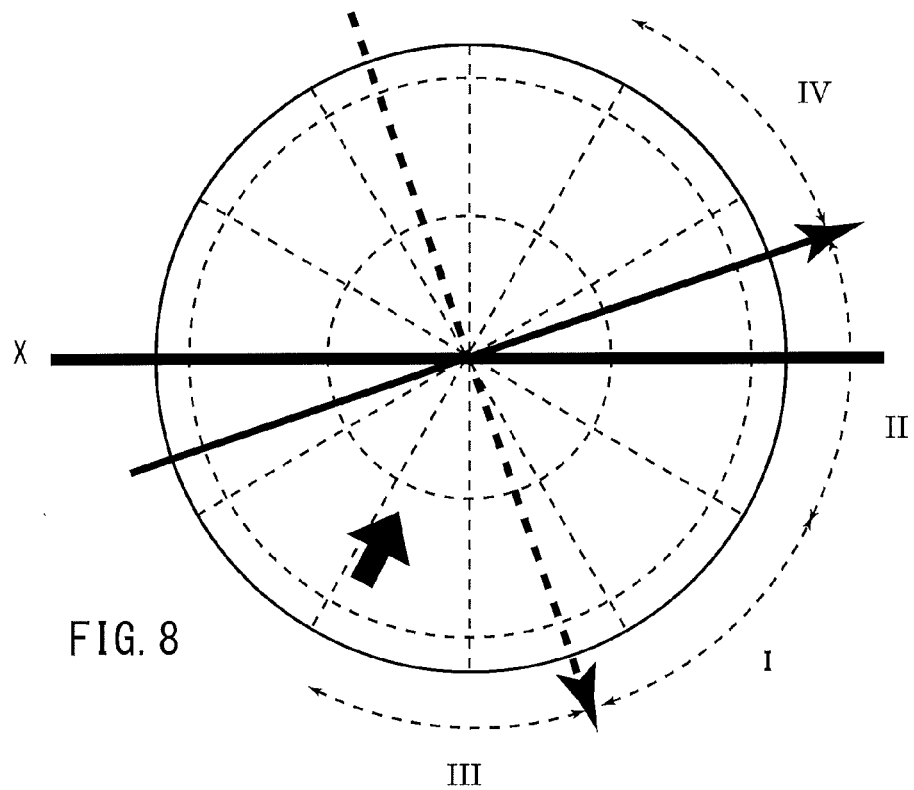
FIG. 8 illustrates the directions of rubbing for the alignment films of the switch panel being rotated 90 degrees clockwise off their positions in FIG. 7.

First, with the relationship between the visual line X shown in FIG. 6 and the absorption axis of the polarizer being maintained, the visual line X is made congruous with the reference line extending in a three-to-nine-o'clock direction, as shown in FIG. 7. Then, as shown in FIG. 8, the directions of rubbing for the alignment film 21a closer to the substrate 21 and the alignment film 22a closer to the counter-substrate 22 are rotated 90 degrees clockwise off the conventional directions of rubbing (i.e. the directions of rubbing shown in FIG. 7). Thus, the direction of rubbing for the alignment film 21a closer to the substrate 21 and the direction of rubbing for the alignment film 22a closer to the counter-substrate 22 are switched, compared with the conventional directions of rubbing (i.e. the directions of rubbing shown in FIG. 7).

Thus, the reference direction of the switch panel 3 is moved from the position indicated by the short black-filled arrow of FIG. 6 to that indicated by the short black-filled arrow of FIG. 8. If the regions shown in FIG. 3 are applied to FIG. 8 in such a way that the reference direction shown in FIG. 8 is congruous with the reference direction of FIG. 3 in the visual angle characteristic diagram of FIG. 3, the visual line X is positioned at the region corresponding to the region II of FIG. 3. Consequently, the visual line X may be positioned in a different region by rotating the directions of rubbing for the alignment films 21a and 22a 90 degrees clockwise off the conventional directions of rubbing (−45 and 45 degrees), as discussed above.

Similarly, although not shown, if the visual line X is positioned at the region IV of FIG. 3, the visual line X may be positioned at the region I of FIG. 3 by rotating the directions of rubbing for the alignment films 21a and 22a 90 degrees clockwise off the conventional directions of rubbing.

Thus, the visual angle characteristics shown in FIG. 3 may be divided into four regions and the directions of rubbing for the alignment films 21a and 22a may be rotated 90 degrees clockwise off the conventional directions of rubbing such that the visual line X positioned at the region III or IV is positioned at the region I or II, respectively. As such, in the following description, only implementations where the visual line X is positioned at the region I or II will be discussed.

Figure 9:
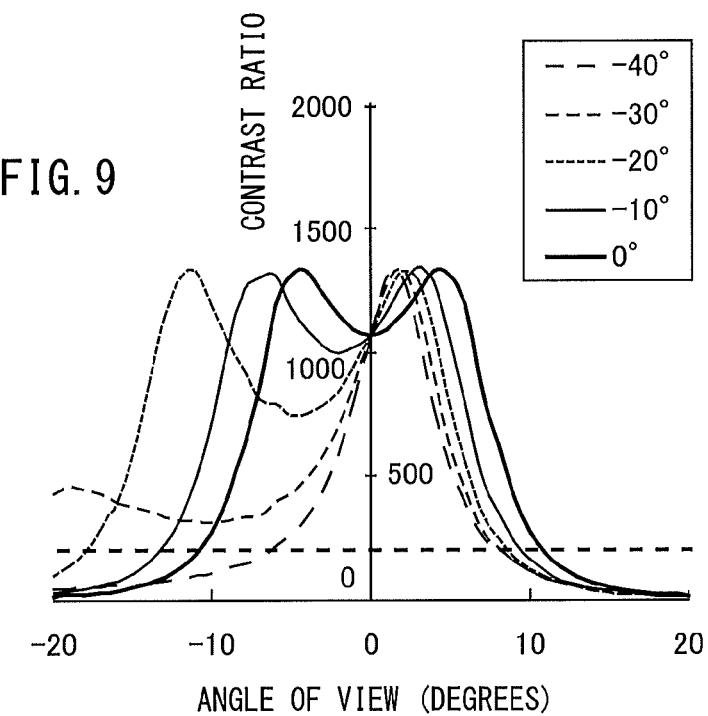
FIG. 9 is a graph showing changes in contrast ratio against the angle of view when the visual line X is positioned at the region I in the visual angle characteristic diagram of FIG. 3.
Figure 10:
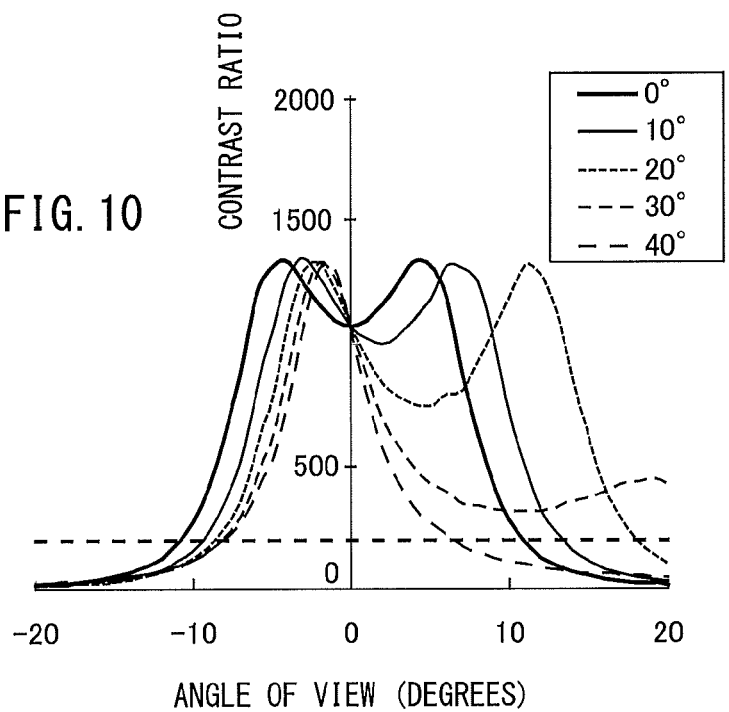
FIG. 10 is a graph showing changes in contrast ratio against the angle of view when the visual line X is positioned at the region II in the visual angle characteristic diagram of FIG. 3.
Figure 11:
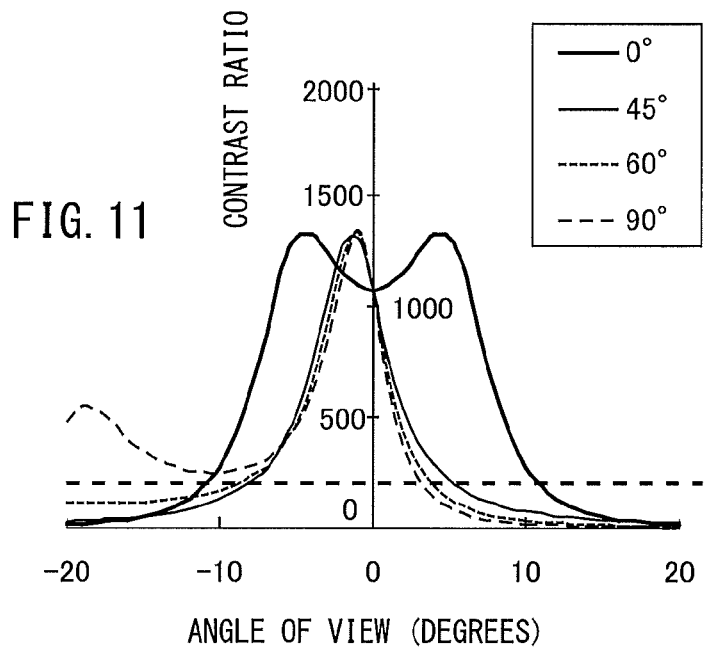
FIG. 11 is a graph showing changes in contrast ratio against the angle of view when the visual line X is positioned at the region IV in the visual angle characteristic diagram of FIG. 3.

Graphs showing contrast ratios provided when the visual line X is positioned at the region I, II or IV are shown in FIGS. 9 to 11. FIGS. 9 to 11 show changes in contrast ratio against the angle of view for different angles of the visual line X in the region I, II or IV. In these drawings, a positive angle of view indicates an angle of view for the right eye, while a negative angle of view indicates an angle of view for the left eye.

As can be understood from FIGS. 9 to 11, when the visual line X is positioned to extend in a three-to-nine-o'clock direction (0 degrees in the drawings), the contrast ratios provided when the angles of view for the left and right eyes are the same are substantially the same; on the other hand, when the visual line X inclines, even the contrast ratios provided when the angles of view for the left and right eyes are the same are significantly different. Particularly, when the visual line X inclines off a three-to-nine-o'clock direction, the contrast ratio drops for positive angles of view (i.e. angles of view for the right eye looking at the panel) in the implementation of FIG. 9 (i.e. when the visual line X is positioned at the region I). On the other hand, in the implementation of FIG. 10 (i.e. when the visual line is positioned at the region II), the contrast ratio drops for negative angles of view (i.e. angles of view for the left eye looking at the panel). Each of the heavy broken lines in FIGS. 9 to 11 indicates a contrast ratio of 200.

In the present embodiment, such a drop in contrast ratio may be prevented by rotating the directions of rubbing in which the alignment films 21a and 22a closer to the substrate 21 and counter-substrate 22, respectively, of the switch panel are rubbed, off the original directions. Typically, in a TN liquid crystal panel, such directions of rubbing for the alignment films are established that are congruous with the angles of absorption axes of the polarizers, i.e. 45 and −45 degrees. However, in the present embodiment, the alignment films 21a and 22a are rubbed in directions of rubbing rotated off the angles of −45 and 45 degrees to minimize the drop in contrast ratio along the visual line X. That is, in the present embodiment, the angle of 90 degrees formed by the directions of rubbing for the alignment films 21a and 22a is maintained while the direction of rubbing for the alignment film 21a, closer to the polarizer 6, is rotated off the absorption axis of the polarizer 6, as viewed from the viewer.

Figure 12:
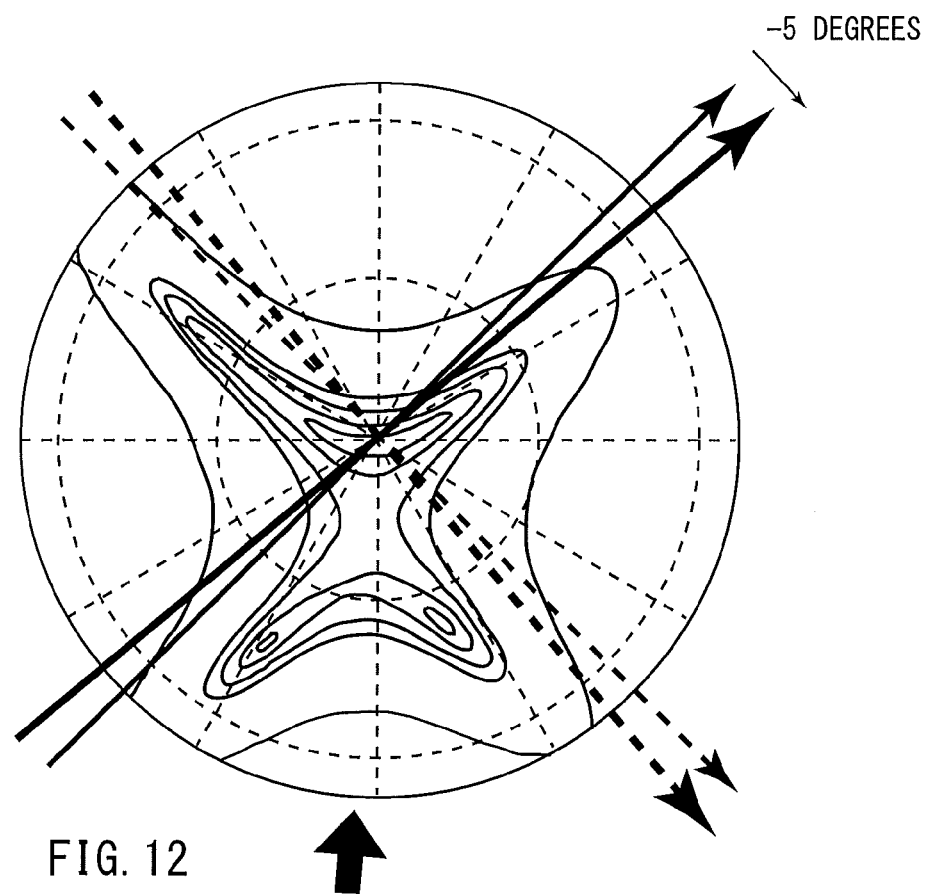
FIG. 12 is a visual angle characteristic diagram with the directions of rubbing for the alignment films of the switch panel being rotated 5 degrees clockwise off their positions in the visual angle characteristic diagram of FIG. 3.
Figure 13:
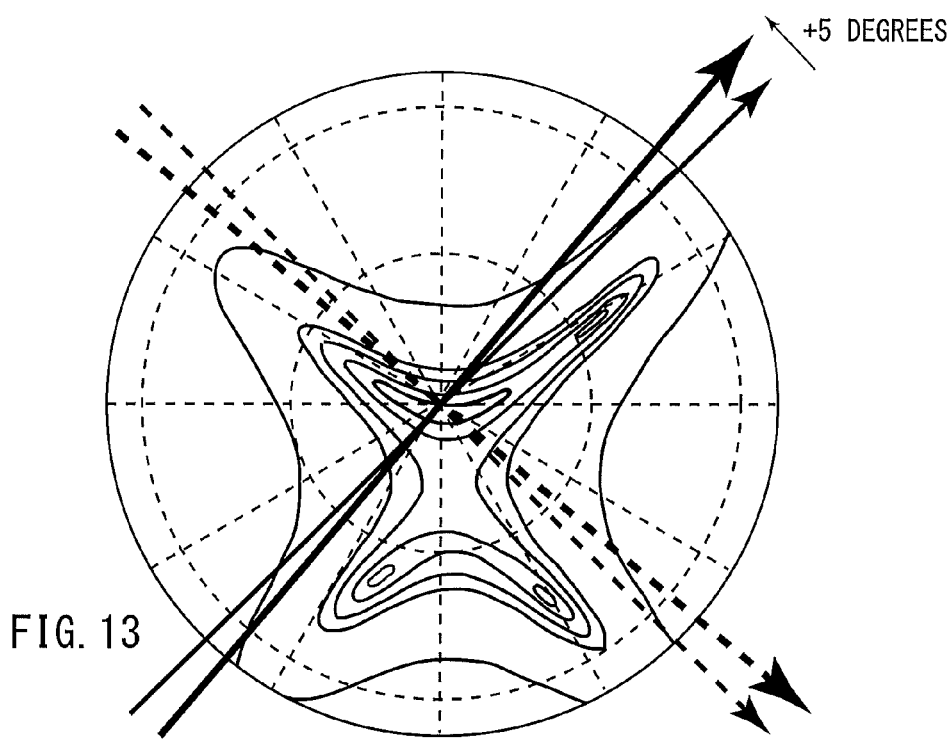
FIG. 13 is a visual angle characteristic diagram with the directions of rubbing for the alignment films of the switch panel being rotated 5 degrees counterclockwise off their positions in the visual angle characteristic diagram of FIG. 3.
Figure 14:
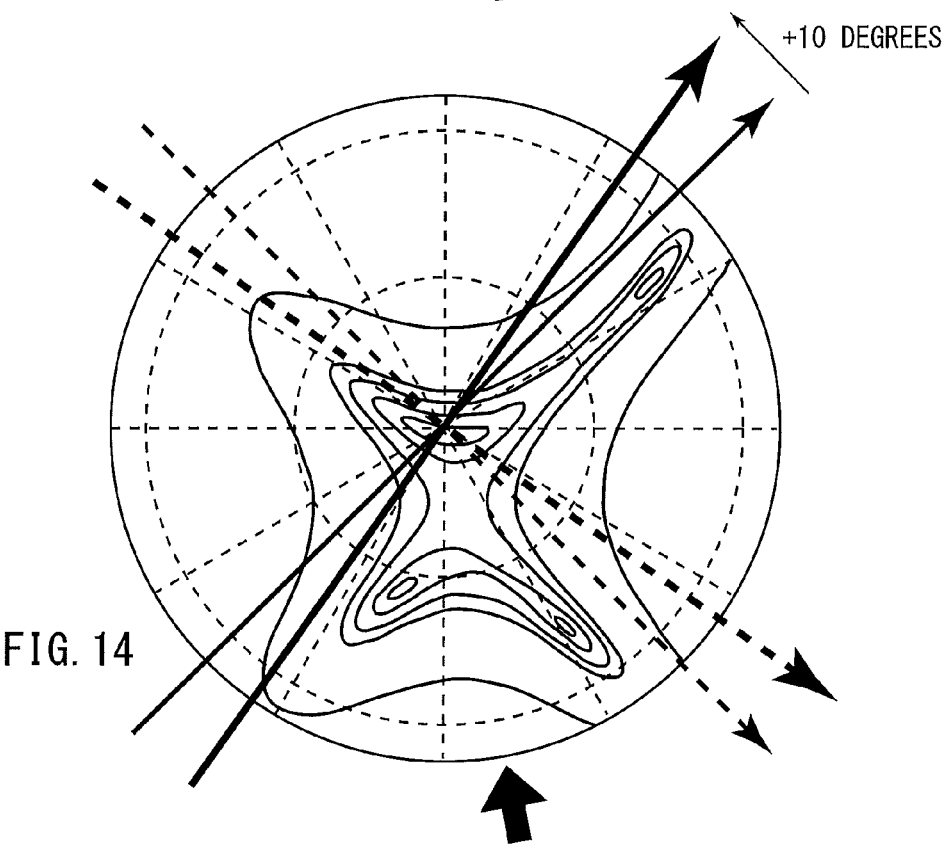
FIG. 14 is a visual angle characteristic diagram with the directions of rubbing for the alignment films of the switch panel being rotated 10 degrees counterclockwise off their positions in the visual angle characteristic diagram of FIG. 3.
Figures 15, 16:
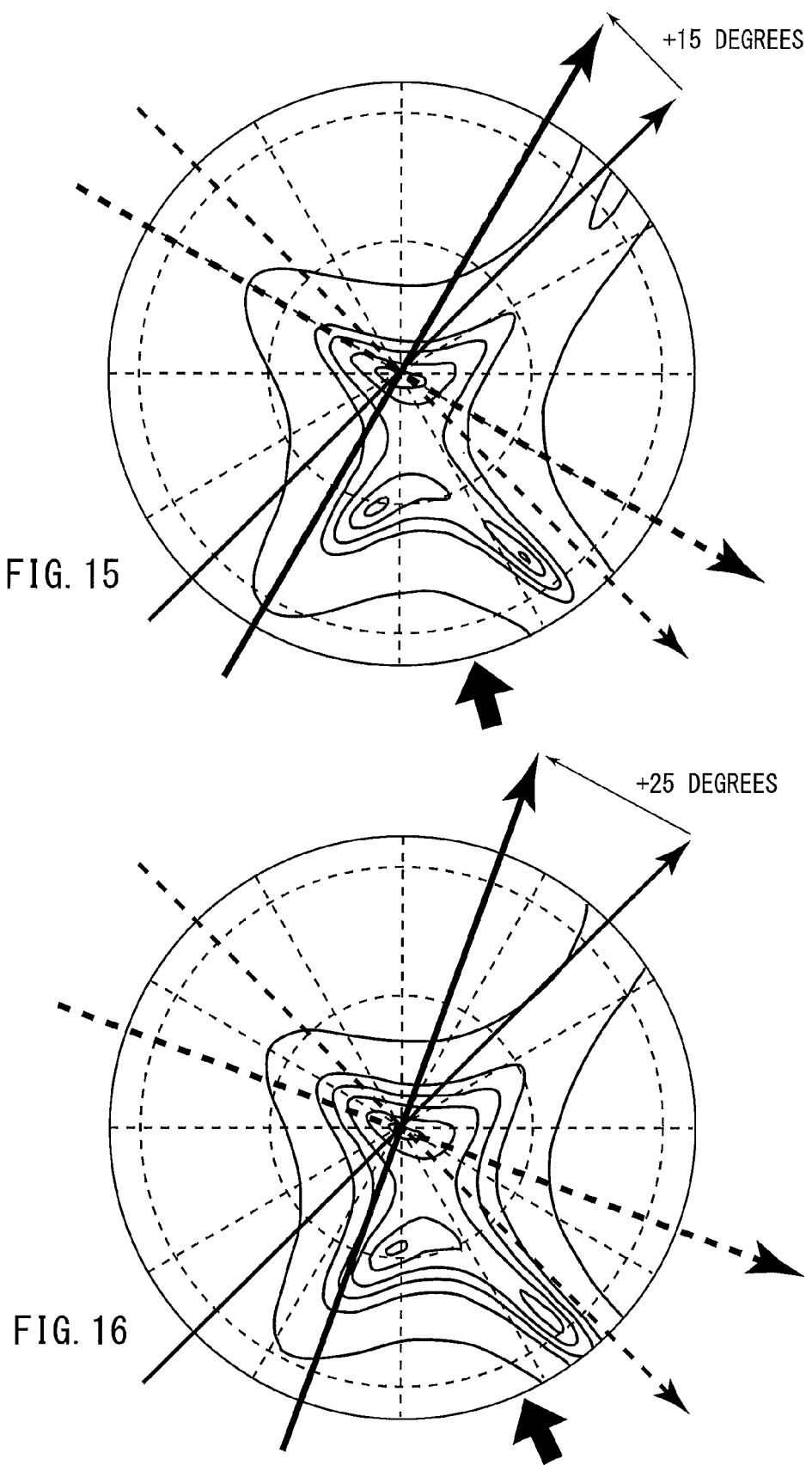
FIG. 15 is a visual angle characteristic diagram with the directions of rubbing for the alignment films of the switch panel being rotated 15 degrees counterclockwise off their positions in the visual angle characteristic diagram of FIG. 3.
FIG. 16 is a visual angle characteristic diagram with the directions of rubbing for the alignment films of the switch panel being rotated 25 degrees counterclockwise off their positions in the visual angle characteristic diagram of FIG. 3.

The visual angle characteristics of the switch panel 3 provided when the directions of rubbing for the alignment films 21a and 22a are rotated −45 and 45 degrees are shown in FIGS. 12 to 16. FIG. 12 shows the visual angle characteristics provided when the directions of rubbing for the alignment films 21a and 22a are rotated 5 degrees clockwise (indicated in the drawing as "−5 degrees"). FIGS. 13 to 16 show the visual angle characteristics provided when the directions of rubbing for the alignment films 21a and 22a are rotated 5, 10, 15, and 25 degrees counterclockwise (indicated in the drawings as "+5 degrees", "+10 degrees", "+15 degrees" and "+25 degrees"). The arrows with a heavy line and heavy broken line in FIGS. 12 to 16 indicate the directions of rubbing for the alignment films 21a and 22a after being rotated, while the arrows with a fine line and fine broken line indicate the directions of rubbing for the alignment films 21a and 22a before being rotated (i.e. 45 and −45 degrees).

As can be understood from these drawings, as the directions of rubbing for the alignment films 21a and 22a are rotated, the reference direction of the switch panel 3 (indicated by the short black-filled arrows of the drawings) is changed and the visual angle characteristics are changed depending on the directions of rubbing. Thus, the directions of rubbing for the alignment films 21a and 22a may be changed to change the visual angle characteristics of the switch panel 3 to prevent the contrast ratio from dropping.

FIGS. 17 to 21 show changes in contrast ratio provided when, in the case of the visual line X positioned at the region I (i.e. the transmission axis of the polarizer 5, located between the main panel 2 and switch panel 3, having an angle of −45 to 0 degrees), the directions of rubbing for the alignment films 21a and 22a of the switch panel 3 are rotated off the reference line extending in a three-to-nine-o'clock direction. Specifically, FIGS. 17 to 21 each show the relationships between the angle of view and contrast ratio provided when the absorption axis of the polarizer 4 (i.e. the transmission axis of the polarizer 5) has an angle of −45, −35, −25, −15 and −5 degrees.

In FIGS. 17 to 21, different reference directions represent different directions of rubbing for the alignment films 21a and 22a. That is, counterclockwise rotations of the directions of rubbing for the alignment films 21a and 22a as viewed from the viewer are represented by counterclockwise rotations (i.e. in the positive direction) of the reference direction. Further, in FIGS. 17 to 21, "Ref." indicates the contrast ratio along the line in a three-to-nine-o'clock direction in a TN liquid crystal panel where the direction of rubbing for the alignment film 22a is congruous with the absorption axis of the polarizer 4 (i.e. the transmission axis of the polarizer 5) (i.e. the direction of rubbing for the alignment films 21a is congruous with the absorption axis of the polarizer 6).

As can be understood from FIGS. 17 to 21, rotating the directions of rubbing for the alignment films 21a and 22a counterclockwise as viewed from the viewer (i.e. rotating the reference direction in the positive direction) prevents the contrast ratio from dropping for angles of view for the right eye (i.e. positive values of azimuth in the drawings). Particularly, it prevents the contrast ratio from dropping in the region of angles of view for the right eye of 10 degrees and smaller.

In a liquid crystal display device capable of displaying a 3D image, as in the present embodiment, a contrast ratio of larger than 200 (indicated by the heavy broken line in FIGS. 17 to 21) is preferable. Such a value of contrast ratio is established to prevent the contour of 3D images and characters displayed on the liquid crystal display device from blurring, as observed by the eye. To obtain a 3D image displayed with a better quality, a contrast ratio of larger than 500 is preferable. Such a value of contrast ratio prevents a 3D image displayed on the liquid crystal display device from producing a residual image, as observed by the eye. Such values of contrast ratio can be obtained when the viewer is positioned in the direction of the normal line extending from the center of the display panel and the distance between the viewer and the center of the display panel is equal to the applicable optimal view distance (see FIG. 22). The contrast ratio established depending on the required quality of displayed 3D images is the reference value of contrast ratio. That is, if the required contrast ratio is 200 or larger, the reference value is 200; if the required contrast ratio is 500, the reference value is 500.

Figures 21, 22:
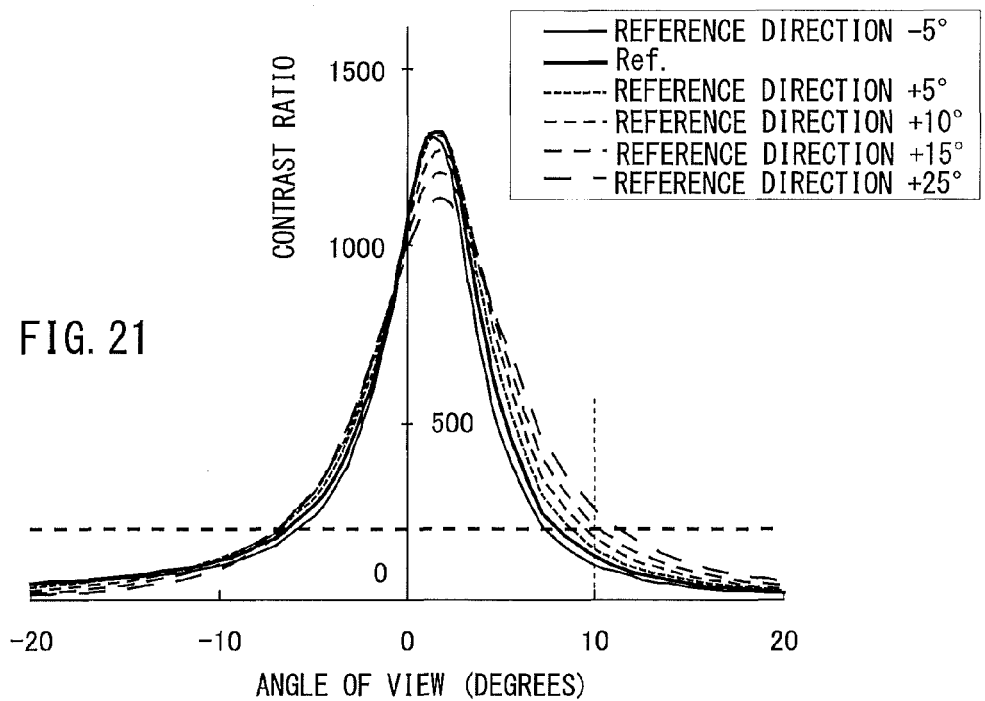
FIG. 21 is a graph showing changes in contrast ratio against the angle of view when the polarizer closer to the viewed side of the main panel has an absorption axis of −5 degrees.
FIG. 22 illustrates the relationship between the screen size and the angle of view.

Measurements of angles of view for liquid crystal display devices of various screen sizes showed that the angles of view are within 20 degrees, as shown in FIG. 22, and mostly around 10 degrees. The angles of view shown in FIG. 22 were obtained by calculating the larger one of the angles between the normal to the panel and the view lines of both eyes where the left and right edges of the panel were viewed by the viewer positioned in the direction of the normal line extending from the center of the panel, where the distance between the centers of the two eyes was 62 mm. The range of angles of view in a left-to-right direction required depending on the screen size of the liquid crystal display device corresponds to the view range. Within this view range, the largest one of the angles of view for the right eye corresponds to the maximum angle of view for the right eye, while the largest one of the angles of view for the left eye corresponds to the maximum angle of view for the left eye. For example, in the present embodiment, the range of angles of view from −10 degrees to 10 degrees corresponds to the view range, the angle of −10 degrees corresponds to the maximum angle of view for the left eye and the angle of 10 degrees corresponds to the maximum angle of view for the right eye.

Therefore, it is preferable to adjust the directions of rubbing for the alignment films 21a and 22a such that the contrast ratio is larger than 200 for an angle of view smaller than 10 degrees. For an angle of view for the right eye smaller than 10 degrees, when the absorption axis of the polarizer 4 (i.e. the transmission axis of the polarizer 5) of the main panel 2 has an angle of −35 degrees (FIG. 18), for example, the directions of rubbing for the alignment films 21a and 22a may suitably be rotated 5 degrees or more counterclockwise, as viewed from the viewer. When the absorption axis of the polarizer 4 (i.e. the transmission axis of the polarizer 5) has an angle of −25, −15 and 5 degrees (FIGS. 19, 20 and 21), the directions of rubbing for the alignment films 21a and 22a may suitably be rotated 15 degrees counterclockwise, as viewed from the viewer.

If angles of view for the left eye of 10 degrees and smaller are considered in addition to the angles of view for the right eyes, when the absorption axis of the polarizer 4 (i.e. the transmission axis of the polarizer 5) has an angle of −35 degrees (FIG. 18), for example, it is preferable to rotate the directions of rubbing for the alignment films 21a and 22a 15 degrees or smaller counterclockwise as viewed from the viewer. Further, for the angles of the absorption axis of the polarizer 4 (the transmission axis of the polarizer 5) of −25 and −15 degrees (FIGS. 19 and 20), it is preferable to rotate the directions of rubbing for the alignment films 21a and 22a 15 degrees counterclockwise as viewed from the viewer.

When the absorption axis of the polarizer 4 (i.e. the transmission axis of the polarizer 5) has an angle of −45 degrees (FIG. 17), the contrast ratio is 200 or larger for angles of view for the left and right eyes of 10 degrees and smaller, meaning that the directions of rubbing for the alignment films 21a and 22a of the switch panel 3 do not need be rotated.

Figure 23:
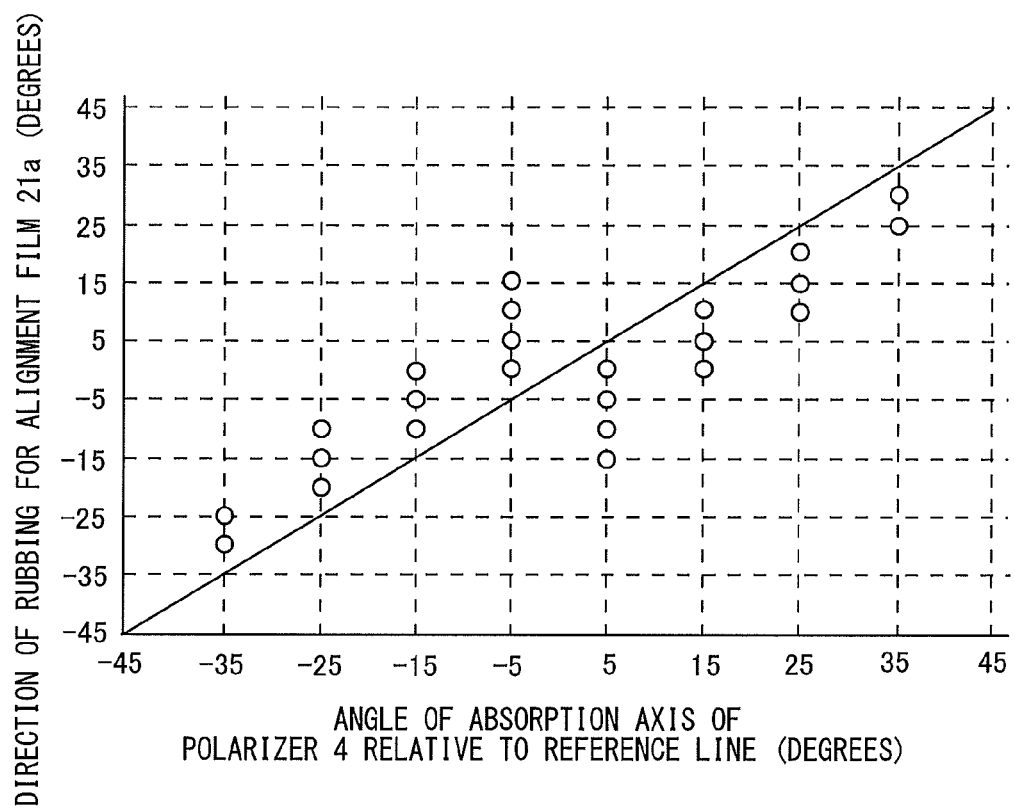
FIG. 23 illustrates the relationship between angle of the absorption axis of the polarizer closer to the viewed side of the main panel and the direction of rubbing for the alignment film closer to the back side of the switch panel which provides a contrast ratio satisfying a reference value.

FIG. 23 shows directions of rubbing for the alignment film 21a for various angles of the absorption axis of the polarizer 4, where the contrast ratio exceeds the reference value (200 in the present embodiment) based on the results of FIGS. 17 to 21. The solid line shown in FIG. 23 indicates the cases where the angle of the absorption axis of the polarizer 4 is consistent with the direction of rubbing of the alignment film 21a, and the circles shown in FIG. 23 indicate directions of rubbing for the alignment film 21a for various angles of the absorption axis of the polarizer 4, where the contrast ratio exceeds the reference value. As can be understood from FIG. 23, the direction of rubbing for the alignment film 21a may be rotated in a direction opposite that in which the absorption axis of the polarizer 4 is rotated off the reference line to reduce the drop in contrast ratio. In addition, it can be understood from FIG. 23 together with FIG. 21 that, the smaller the angle of the absorption axis of the polarizer 4 relative to the reference line, the smaller the changes in contrast due to the changes in the angle of the direction of rubbing for the alignment film 21a are. This is because the switch panel 3 has the visual angle characteristics shown in FIG. 3, meaning only small circumferential changes in contrast near the reference line in the visual angle characteristic diagram.

As discussed above, it is preferable that the contrast ratio exceeds a reference value (200 in the present embodiment) and, in addition, the directions of rubbing for the alignment films 21a and 22a are rotated such that the contrast ratios for the maximum angle of view for the left eye (−10 degrees in the present embodiment) and for the maximum angle of view for the right eye (10 degrees in the present embodiment) are equivalent. As shown in FIGS. 18 to 21, a graph of the contrast ratio against the angle of view is shaped as a mountain with larger contrast ratios for smaller angles of view. Thus, the directions of rubbing may be rotated as discussed above to reduce the changes in contrast ratio for the view range for the left and right eyes to make the graph of the contrast ratio close to symmetrical relative to the angle of view of 0 degrees. Thus, when the viewer views the display screen of the liquid crystal display device with the left and right eyes, the contrast ratios of the switch panel 3 relative to a given angle of view for the left and right eyes are close to equal, thereby improving the quality of displayed 3D images.

Effects of Embodiment

In the present embodiment, each of the alignment films 21a and 22a of the switch panel 3, which is a TN liquid crystal panel, is rubbed in a direction offset from their respective original direction of rubbing. Specifically, the directions of rubbing for the alignment films 21a and 22a of the switch panel 3 are rotated so as to reduce the drop in contrast ratio for angles of view for the right eye, the contrast ratio being measured on the visual line X corresponding to the transmission axis of the polarizer 5 of the main panel 2.

Thus, the drop in contrast ratio may be reduced even when the distribution of contrast ratios in a horizontal direction (i.e. on the reference line), which is important in displaying 3D images, becomes one on a line with an angle relative to the three-to-nine-o'clock direction (i.e. the reference line) in the visual angle characteristics of the switch panel 3 due to the polarizer 4 of the main panel 2. This prevents deterioration in the quality of display due to a decrease in contrast ratio when a 3D image is to be displayed on the liquid crystal display device.

Typically, the absorption axis of the polarizer 4 (i.e. the transmission axis of the polarizer 5) for the main panel 2, which is a VA liquid crystal panel, is in the range between −45 to 0 degrees relative to a three-to-nine-o'clock direction (i.e. the region I in FIG. 3) as viewed from the viewer. Thus, the drop in contrast ratio for angles of view for the right eye may be effectively reduced by rotating the directions of rubbing for the alignment films 21a and 22a of the switch panel 3 counterclockwise as viewed from the viewer. That is, the imbalance in contrast ratio for the left and right eyes may be reduced by rotating the direction of rubbing for the alignment film 21a on the back side of the liquid crystal layer 23 (the side closer to the alignment film 6) of the switch panel 3 counterclockwise off the absorption axis of the polarizer 6, as viewed from the viewer.

Further, if the absorption axis of the polarizer 4 (i.e. the transmission axis of the polarizer 5) is positioned in the range of 45 to 90 degrees relative to a three-to-nine-o'clock direction (i.e. at the region IV in FIG. 3) as viewed from the viewer, or in the range of −45 to −90 degrees (i.e. at the region III in FIG. 3), then the directions of rubbing for the alignment films 21a and 22a are rotated 90 degrees clockwise off the conventional directions of rubbing (−45 and 45 degrees). Thus, the absorption axis of the polarizer 4 (i.e. the transmission axis of the polarizer 5) positioned at the region IV or III of FIG. 3 may be positioned at the region I or II of FIG. 3.

Thus, if the absorption axis of the polarizer 4 (i.e. the transmission axis of the polarizer 5) is positioned at the region IV, which is located counterclockwise relative to the reference line in FIG. 3, then the direction of rubbing for the alignment film 21a closer to the polarizer 6 may suitably be rotated counterclockwise, as viewed from the viewer, off the absorption axis of the polarizer 6, similar to implementations where the absorption axis of the polarizer 4 is positioned at the region I of FIG. 3. On the other hand, if the absorption axis of the polarizer 4 (i.e. the transmission axis of the polarizer 5) is positioned at the region III, which is located clockwise relative to the reference line in FIG. 3, then the direction of rubbing for the alignment film 21a closer to the polarizer 6 may suitably be rotated clockwise as viewed from the viewer off the absorption axis of the polarizer 6, similar to implementations where the absorption axis of the polarizer 4 is positioned at the region II of FIG. 3 (as discussed in "Other Embodiments" below).

Thus, if the absorption axis of the polarizer 4 (i.e. the transmission axes of the polarizer 5) is positioned at the region III or IV of FIG. 3, the directions of rubbing for the alignment films 21a and 22a are rotated 90 degrees clockwise off the conventional directions of rubbing. Thus, the direction of rubbing for the alignment film 21a may be rotated, off the absorption axis of the polarizer 6, in a direction in which the absorption axis of the polarizer 4 (i.e. the transmission axis of the polarizer 5) is rotated off the reference line to reduce the left-right imbalance in contrast ratio.

Other Embodiments

Although an embodiment of the present invention has been illustrated, this embodiment is merely an example that can be used to carry out the present invention. Thus, the present invention is not limited to the above embodiment, and the above embodiment may be modified without departing from the spirit of the invention.

In the above embodiment, the main panel is a VA liquid crystal panel. However, the main panel may be of other types, such as in-plane switching (IPS) or TN.

Further, in the above embodiment, the switch panel is a TN liquid crystal panel. However, the switch panel may be of other types, such as IPS or VA.

Furthermore, in the above embodiment, the module 1 is constructed by disposing the polarizer 4, main panel 2, polarizer 5, switch panel 3 and polarizer 6 upon one another in the stated order, beginning with the viewed side of the module. However, the switch panel 3 may be located closer to the viewer than the main panel 2 is. In such cases, too, the angle of the absorption axis of the polarizer located between the switch panel 3 and main panel 2 must be adjusted to the main panel 2, and thus the directions of rubbing for the alignment films 21a and 22a of the switch panel 3 must be rotated.

Moreover, in the above embodiment, the liquid crystal in the switch panel 2 has a value of dΔN in the range of 1000 to 1300 nm. However, the liquid crystal may have a value of dΔN in other ranges.

Further, in the above embodiment, the directions of rubbing are adjusted to accommodate implementations where the absorption axis of the polarizer 4 closer to the viewed side of the main panel 2 is positioned in the range between −45 and 0 degrees, as viewed from the viewer, in FIG. 17 to 21. However, the method of the present embodiment may also be used to reduce the imbalance in contrast ratio when the absorption axis of the polarizer 4 (i.e. the transmission axis of the polarizer 5) is positioned in the range between 0 and 45 degrees (i.e. at the region II of FIG. 3), as viewed form the viewer. Specifically, if the absorption axis of the polarizer 4 (i.e. the transmission axis of the polarizer 5) is positioned in the range between 0 and 45 degrees, visual angle characteristics with angles of view having reversed signs compared to those of FIGS. 17 to 21 are provided. Thus, in such implementations, the direction of rubbing for the alignment film 21a may suitably be rotated clockwise as viewed from the viewer, contrary to implementations where the absorption axis of the polarizer 4 (i.e. the transmission axis of the polarizer 5) is positioned at the region I in FIG. 3.

INDUSTRIAL APPLICABILITY

The display device according to the present invention is useful as a display device including a display panel capable of displaying 3D images.

The invention claimed is:

1. A display device comprising:
a main panel configured to display an image;
a switch panel located opposite the main panel for displaying a slit image serving as a parallax barrier to allow an image displayed on the main panel to be viewed stereoscopically;
a first polarizer located closer to a viewed side of the main panel;
a second polarizer located between the main panel and the switch panel; and
a third polarizer located closer to a side of the switch panel opposite a side closer to the main panel,
wherein the switch panel includes a pair of opposite substrates and a liquid crystal layer formed between the pair of substrates,
each of the substrates has an alignment film on a side closer to the liquid crystal layer, the alignment films having been rubbed at different angles as viewed from a viewed side of the switch panel,
a direction of rubbing for one of the alignment films located closer to the third polarizer is at an angle relative to an absorption axis of the third polarizer as viewed from the viewed side of the main panel such that a contrast ratio within a view range of left and right eyes is equal to or higher than a reference value, the contrast ratio being measured on a visual line for the switch panel corresponding to a transmission axis of the second polarizer.

2. The display device according to claim 1, wherein the direction of rubbing for the alignment film located closer to the third polarizer is at an angle relative to the absorption axis of the third polarizer as viewed from the viewed side of the switch panel such that contrast ratios resulting from a maximum angle of view for the left eye and a maximum angle of view for the right eye are equal in the view range, the contrast ratios being measured on the visual line.

3. The display device according to claim 1, wherein the switch panel is a TN liquid crystal panel.

4. The display device according to claim 3, wherein the direction of rubbing for the alignment film located closer to the third polarizer is at an angle counterclockwise relative to the absorption axis of the third polarizer if the transmission axis of the second polarizer is at an angle of 0 to 45 degrees clockwise relative to a reference line extending horizontally as viewed from the viewed side of the main panel.

5. The display device according to claim 3, wherein the direction of rubbing for the alignment film located closer to the third polarizer is at an angle clockwise relative to the absorption axis of the third polarizer if the transmission axis of the second polarizer is at an angle of 0 to 45 degrees counterclockwise relative to a reference line extending horizontally as viewed from the viewed side of the main panel.

6. The display device according to claim 3, wherein, if the transmission axis of the second polarizer is at an angle of 45 to 90 degrees clockwise or counterclockwise relative to a reference line extending horizontally as viewed from the viewed side of the main panel, the direction of rubbing for the alignment film located closer to the third polarizer is at an angle in the same direction relative to the absorption axis of the third polarizer as a direction in which the transmission axis of the second polarizer is at an angle relative to the reference line.

7. The display device according to claim 3, wherein the switch panel has a retardation of 1000 to 1300 nm.

* * * * *